United States Patent [19]

Stiner

[11] 4,402,469

[45] Sep. 6, 1983

[54] SELF-ALIGNING DRAG DRIVE FOR FISHING REELS

[75] Inventor: Roy E. Stiner, Tulsa, Okla.

[73] Assignee: Brunswick Corporation, Skokie, Ill.

[21] Appl. No.: 289,037

[22] Filed: Jul. 31, 1981

[51] Int. Cl.³ ............................................. A01K 89/02
[52] U.S. Cl. ............................................. 242/84.5 A
[58] Field of Search ................. 242/84.21 R, 84.21 A, 242/84.2 R, 84.2 G, 84.5 A, 84.51 A, 84.5 R, 84.51 R

[56] References Cited

U.S. PATENT DOCUMENTS

| 2,863,617 | 12/1958 | Chapin et al. | 242/84.5 A |
| 3,107,876 | 10/1963 | Ament | 242/84.21 R |
| 3,222,009 | 12/1965 | Sarah | 242/84.21 A |
| 4,200,248 | 4/1980 | Puryear | 242/84.51 A |
| 4,238,085 | 12/1980 | Jansson et al. | 242/84.21 R |

FOREIGN PATENT DOCUMENTS 1020118  2/1953  France ........................ 242/84.21 R Primary Examiner—Billy S. Taylor
Attorney, Agent, or Firm—John G. Heimovics

[57] ABSTRACT

This invention comprehends a mechanism that applies a uniform drag on an aft or rear mounted drag mechanism. A driver member is keyed to the centershaft and is engaged by floating friction drive members nested between friction units which floating friction drive members and friction units permit wide centershaft concentricity or misalignment without creating binding or tightness of the centershaft.

6 Claims, 5 Drawing Figures

SELF-ALIGNING DRAG DRIVE FOR FISHING REELS

TECHNICAL FIELD

This invention relates to spinning style fishing reels and more particularly, relates to an improved self-aligning aft mounted drag mechanism for such a reel.

BACKGROUND OF THE PRIOR ART

It is well known in the prior art of fishing reels to provide aft or rear mounted drag systems for the center shaft so as to vary the drag on the spool as desired. These spinning reels are difficult to manufacture due to the extremely tight tolerances required through the entire length of the center shaft and the body to prevent tight spots in operation. The surface of the rotor or shaft must be maintained to a reasonable degree of smoothness and the tolerances with respect to concentricity of the shaft must be maintained within relatively tight limits.

Heretofore, one method of drag actuation was to place a driver that was operated by the center shaft between friction washers and thereafter apply force to the stack to provide resistance to spool turning. When the force was applied, the driver was captured in place and, depending upon the position, would put side loads on the center shaft. As the reel was operated and the mechanism oscillated, the side load on the shaft could bind and/or cause tightness.

The drag mechanism described in the present application is directed toward the problems heretofore encountered and constitutes an improved design that eliminates the side loads and resulting tight spots in the operation of the center shaft of the reel.

DISCLOSURE OF THE INVENTION

This invention is directed to overcoming one or more of the problems set forth hereinabove and relates to a spinning style fishing reel with an improved means for mounting a drag system on the rear or aft portion of the reel which substantially eliminates tight spots in operation of the reel. The improved drag system will alleviate the tolerance requirements and will allow the center shaft to nutate through a greater area. The improved mechanism uses a floating non-friction driver member keyed on the centershaft for rotation with the centershaft and for axial movement along the centershaft. The driver member has an external uneven shape which fits loosely but drivingly in a driven member which has axially facing friction surfaces thereon. Friction washers are urged against the driven member by a resiliently urged knob to provide drag to the centershaft through the driver member. Clearance is provided between the internal driver and the driven member to accommodate for centershaft misalignment. The outside configuration of the driver member can encompass any number of shapes, but for illustration purposes, is depicted as hexagonal. The mechanism is less expensive to manufacture, eliminates tight spots and affords a positive drag system for the centershaft.

IN THE DRAWINGS

DESCRIPTION OF BASIC STRUCTURE AND OPERATION OF FISHING REEL

Figure 1:
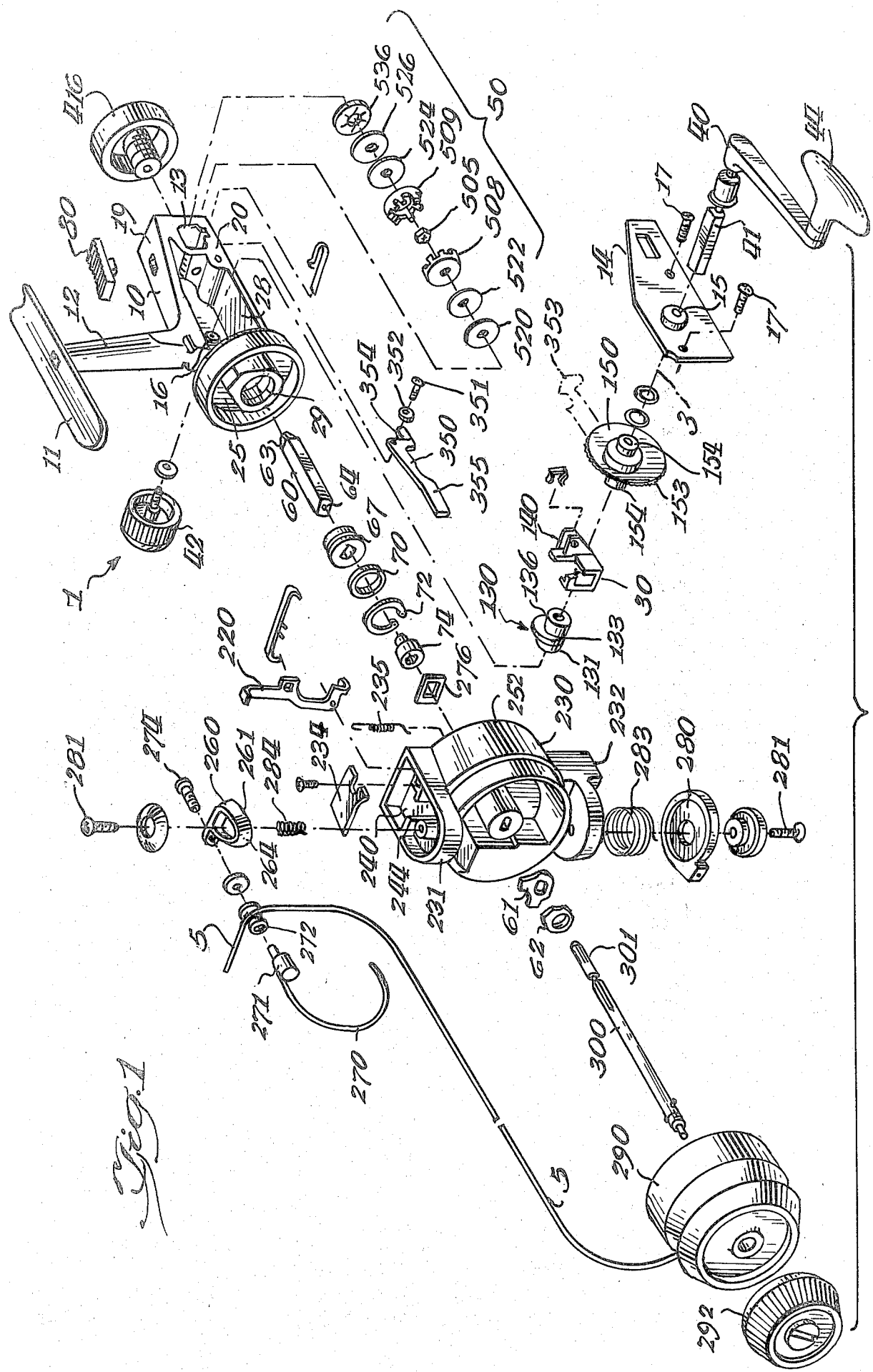
FIG. 1 is an exploded perspective view of a reel embodying the invention.
Figure 2:
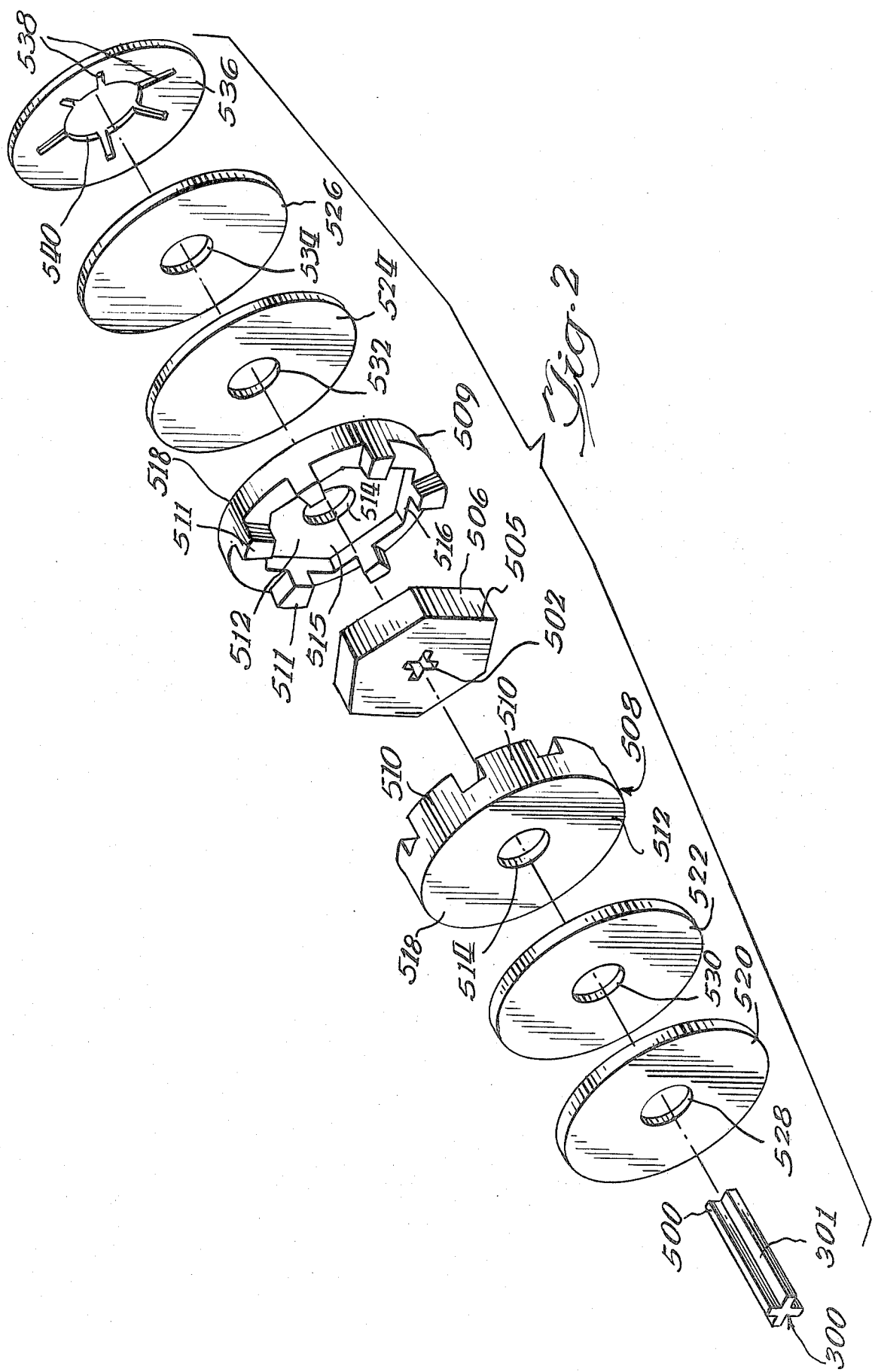
FIG. 2 is an exploded perspective view of the improved drag mechanism.

In FIG. 1 an open face style fishing reel 1 is shown in an exploded perspective view. The reel 1 having a housing 10 which includes an integral gear case 28, a stem 12 which connects the housing 10 to a mounting foot 11 which is used to attach the reel to a spinning style fishing rod. The reel includes a crank assembly 40 rotatable about a crank handle shaft 41 with a rotatable winding handle 44 for use by a fisherman with his left hand for line retrieval while the rod (not shown) is being held by his right hand. The handle 44 may be disposed on the other side of the gear case 28 to accommodate the personal desires of the user.

An axially mounted rotor housing 230 is provided and adapted to rotate about the axis of the central spool shaft 300 as the crank 40 is turned for line retrieval with the line 5 being captured by the bail 270 passing over the line roller 272. The bail 270 and the line roller 272 rotate with rotor 230 and the fishing line 5 is thereby wound on the spool 290. The screws 281 function as pivot points and are accordingly the centers of rotation of the bail 270 via the bail arms 260 and 280.

An oscillator mechanism 30 causes the spool 290 to reciprocate axially back and forth as the rotor 230 winds a line 5 about the spool 290; but as in spinning reels generally, the spool 290 does not rotate about the axis of the central shaft 300 except as controllably permitted by the adjustable drag mechanism 50. Such limited rotation of the spool may occur during line retrieval when a fish is on the other end of the line 5 fighting for its life while still in the water; and thus, the force of the drag friction is overcome by tension in the line. This is a feature that prevents the internal mechanism from being destroyed when a large fish is on the end of the line 5. When the bail 270 is swung to an open position for casting, the line 5 may freely payout from the spool 290.

In the overall arrangement of the reel, a side cover plate 14 is secured to the housing 10 to cover the gear housing 28 which includes a drag pocket 13 and is accomplished by means of screws 17. The drive gear assembly 150 includes a drive gear 153 that is mounted on the drive gear shaft 154 and is received at one end in the side lip 136 of cam 130. Bearing collar 131 is coaxial with the lip 136 and mounted on the opposite side of the cam surface 133.

The gear assembly 150 and the oscillator cam 130 each have an internal hole and are coaxially mounted on the crank handle 41 with the drive shaft 154 externally mounted in the side plate bearing 15 and the bearing collar 131 mounted in a bearing 16 that is part of the side of the housing 10 and coaxial with bearing 15 (but not shown in FIG. 1). Oscillator slide yoke 140 surrounds cam surface 133 of the cam assembly 130 and is slidably mounted near the bearing 16 in the gear case 28. Retainer screw 42 secures the crank handle shaft 41 to the reel 1. As can be readily appreciated, the crank assembly 40 can be removed from the reel 1 and reversed so that the reel 1 can be held by a fisherman in his left hand and cranked by his right hand.

Pinion assembly 60 is mounted in the front hole 29 of the front face 25 and surrounded by bearing 70 which is kept in place by retainer 72. Mounted inside the gear case 28 on the pinion assembly 60 is the self-centering ratchet 67. In front of retainer 72, a spacer ring 74 and a trip lever retainer 276 are mounted on the pinion 60. The rotor 230 is mounted on the pinion assembly 60 in front of retainer 276 and is secured thereto by means of washer 61 and nut 62. Center spool shaft 300 is rotatably mounted in and supported by the pinion assembly hole 64 with the back end 301 thereof extending past the partition 20 into the drag assembly 50. The spool 290 is mounted on the shaft 300 and secured thereto by means of spool cap 292. The shaft 300 is secured to the oscillator yoke slide 140 and reciprocates back and forth relative to the rotor when the crank handle shaft 41 rotates.

Pinion gear 63 mounted at the back of the pinion assembly 60 mates with the drive gear 153 and is rotatable thereby. The pinion assembly 60 in turn causes the rotor 230 to rotate about the spool 290. Because the oscillator cam assembly 30 and the gear drive assembly 150 are both operated by the crank assembly 40 at the same time, the spool 290 reciprocates back and forth relative to the rotational motion of the line roller 272 about the spool and by this cooperative movement the line 5 is wound around the spool 290.

The axis of the rotor 230, shaft 300, pinion assembly 60, and drag assembly 50 is approximately perpendicular to the axis 3 of the crank handle assembly 40, oscillator mechanism 30 and the drive gear assembly 150. The axis 2 is located above the axis 3 being nearer to the foot 11.

The bail 270 is normally stored in the "closed" or "retrieve" position whereby the line roller 272 functions to wind the line 5 about the spool 290 by turning the handle 44 relative to the reel 1. When the bail 270 is to be open or placed in the "casting" or "open" position, the bail 270 is pivoted about the L-shaped bail ears 231 and 232 and locked in place by the trip lever 220 that is received by the cam 261 and trip ramp 264 surfaces located on the underside of the bail arm 260 (not shown in FIG. 1); the underside of bail arm 260 faces into the cavity of the ear 231.

In the casting position, the line 5 is free to payout from the spool 290. During casting, this payout of the line is quite rapid, thus, the fisherman using this open faced style fishing reel is obligated to use his finger to snub the line to arrest the payout since neither the rewind or line retrieval mode (the winding of the line about the spool 90 by the line roller 272) or the drag mechanism 50 is operational. In order to change the bail from the "open" casting position to the "closed" rewind or retrieve position, the rotor 230 is rotated causing the trip lever 220 to disengage from the trip ramp 264 permitting the bail return springs 283 and 284 to pivot the bail 270 back to the retrieve position.

A self-centering bail mechanism is shown that permits the rotation of the rotor 230 to the same position for opening the bail 270 at the optimum casting position. A self-centering lever arm 350 is mounted within the gear case by means of screw 351 and washer 352 with the back end 354 of the arm 350 in operable engagement with the self-centering button 80. The lever arm spring 353 mounted on the drive gear shaft 154 urges the pawl end 355 toward the ratchet 67. But, with the button 80 in the back position, the pawl 355 is pivoted out of engagement with the ratchet 67. When the button 80 is in the forward position closer to the stem 12 and farther from the drag assembly 50, then the bottom of the button 80 permits the pawl end 355 of the arm 350 to come into contact with the ratchet 67 so that the rotor 230 can be rotated "backwards" (counter to the direction of rotation for winding the line around the spool) to a pre-selected position for opening the bail at the casting position. The same mechanism acts as an anti-reverse device for the reel so that the rotor can only be rotated "backward" less than one revolution.

DESCRIPTION OF THE PREFERRED EMBODIMENTS

Figure 3:
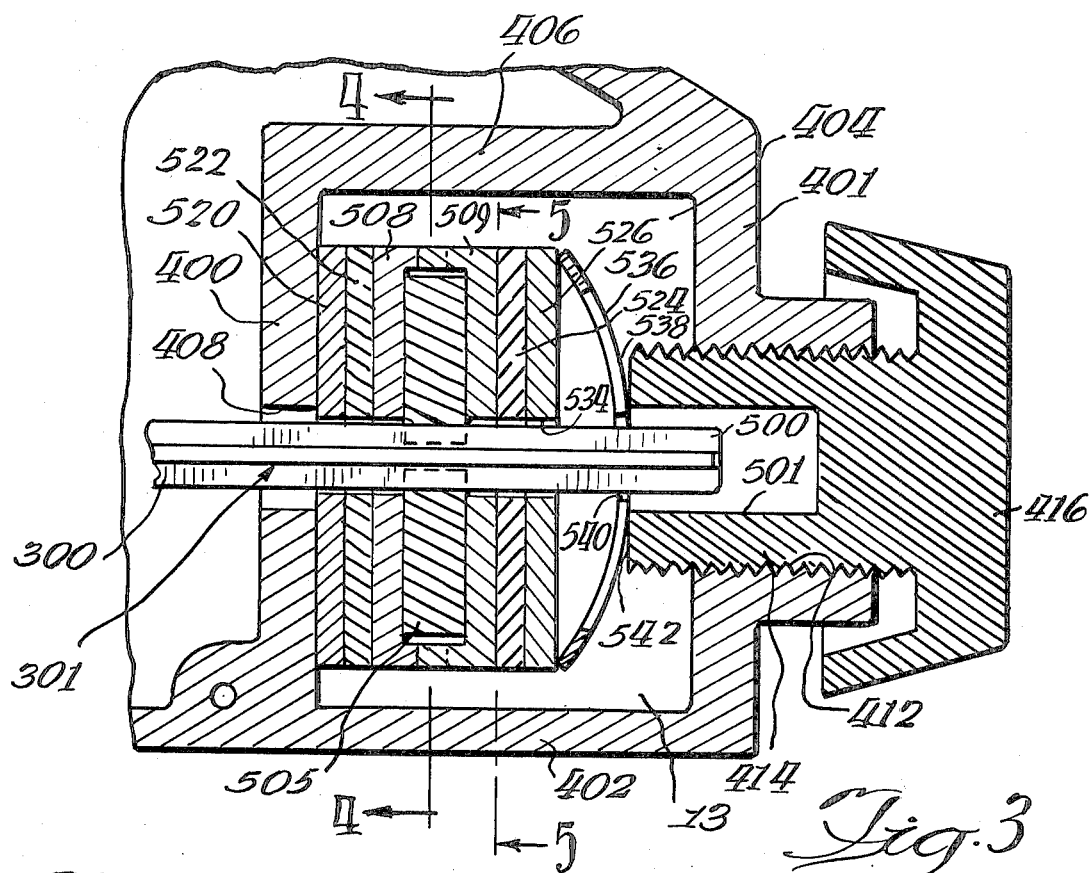
FIG. 3 is a sectional view taken along the line 3—3 of FIG. 4.
Figure 4:
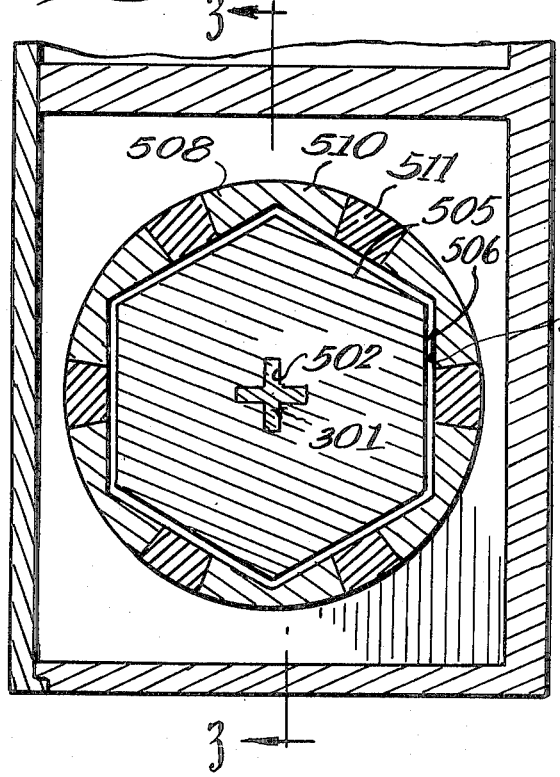
FIG. 4 is a sectional view taken along the line 4—4 of FIG. 3.
Figure 5:
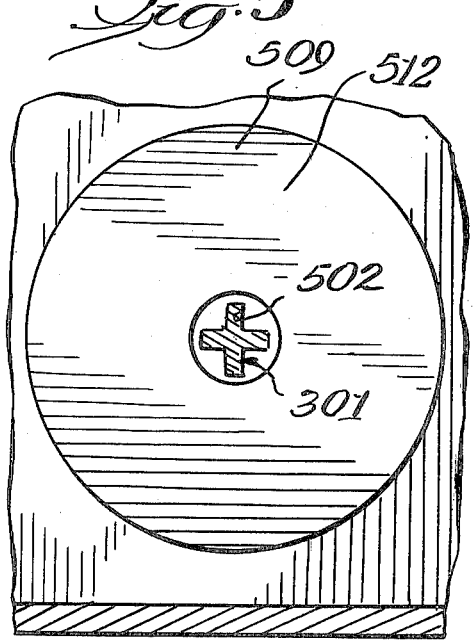
FIG. 5 is a sectional view taken along the line 5—5 of FIG. 3.

Turning to FIGS. 1 through 5, inclusive, an embodiment of the rear mounted drag mechanism 50 of this invention is illustrated. As seen in FIGS. 1 and 3, the reel housing 10 has located therein a partition 400 opposed by a rear wall 401 of the reel housing 10. The partition 400 and rear wall 401 are separated by a bottom 402, a pair of opposing sidewalls 404 and a top 406 all of which cooperate to form a drag pocket 13 to house the drag mechanism 50. The partition 400 has a shaft accommodating center bore 408 larger in diameter than the shaft 300, extending therethrough. The rear wall 401 of the drag pocket 13 has a threaded bore 412 coaxial with the center bore 408 of the partition 400 to receive a threaded post 414 having attached thereto outer, manually manipulable knob 416.

The centershaft 300 has the keyed rear end portion 301 projecting through the center bore 408 and into the drag pocket 13, with the rearmost end 500 being telescopically received in a blind cavity 501 in the post 414. Located in the drag pocket 13 and having a spline 502 mating with the spline 301 in the centershaft is a non-frictional internal driver 505 which slides axially on the centershaft and rotates with the centershaft. The internal driver 505 has a hexagonal outside peripheral surface 506, although it is to be understood that any unevenly shaped peripheral surface 506 will suffice.

A pair of shallow cup shaped driven members 508, 509 have mating and interfitting segments 510 and 511, respectively, which project axially from circular base portions 512. Apertures 514, larger in diameter than the centershaft 300, are formed through the mid-portions of the base portions 512. The driven members 508, 509 have cavities 515 formed therein which cavities have inwardly facing outer walls 516 which define a shape matching the shape of the internal driver 505, i.e., hexagonal. As will be noticed in the cross-sectional view of FIG. 4, there is a clearance or spacing between the driver 505 and the driven members 508 509 which will permit the centershaft rear end portion 301 to rotate in nutational manner without causing tight spots on the centershaft. The axially facing surfaces 518 of the base portions 512 of the driven members have frictional characteristics.

Two substantially identical pairs of separate friction washers 520, 522, and 524, 526, of appropriate material and having apertures 528, 530, 532, 534 extending through the center thereof, are disposed about the spline 301. The friction washers 520, 522 are disposed between the partition 400 and the friction surface 518 of the driven member 508 while friction washers 524, 526 are disposed between the driven member 509 and a cup shaped spheroid spring washer 536. The spring washer 536 has fluting or slots 538 radiating out from a center opening 540 to facilitate compression thereof. The opening 540 of the spring 536 encircles the spline 301 on the centershaft and permits the centershaft to pass freely therethrough. The knob 416, threaded in opening 412, has an axially extending face 542 bearing against the crown of the spring washer 536.

INDUSTRIAL APPLICABILITY

An open faced spinning reel 1 employing the improved rear drag mechanism 50 has the driver 505 engaging the spline 301 on the centershaft with the driven members 508, 509 encasing the driver 505. The driver 505 has an unevenly shaped outer periphery 506 nesting in mating shaped cavities 515 with a clearance between the shaped periphery 506 and the walls of the cavity 515. One or more friction washers 520, 522, 524, 526 are positioned between the partition 400 and the driven member 508 and between driven member 509, and the spring 536 whereupon advancing or retracting the knob 416 will increase or decrease the drag on the centershaft 300. As the knob 416 advances to the left in FIG. 3, the spring 536 urges the friction washers against the driven members 508, 509 and against partition 400 resisting rotation of the driven members 508, 509 by the driver member 505 and centershaft 300. The spline 301 on the centershaft rotates the driver member 505 such that the shaped outer surface 506 engages with the mating walls of the cavity 515 to drive the driven members 508, 509. Resistance by the friction washers to the rotation of the driven members 508, 509, resists rotation of the centershaft thereby providing the desired drag on the spool.

The centershaft 300 can nutate or rotate off the axis of the centershaft due to warping or the like without causing tight spots or binding in the long mechanism. This is accomplished by means of the driver member 505 being free to move radially relative to the driven members in the nest in the driven members without said radial movement contacting a non-movable member thereby binding the centershaft.

The slip fit arrangment of the shaft end 301 in the hole 502 is such that the rotational movement of the shaft 300 causes rotation of internal driver 505. The end 301 and the hole 502 can have mating shapes such as D-shaped, double-D, square shape, hexagonal shape, and the like. It is fully contemplated that the spring washer 536 can be replaced by any suitable tensioning device such as a coil spring, o-ring, bellville washer, spider legged spring washer, and the like. In a preferred embodiment of the invention, the washers 520 and 526 have an external shape such that they will not rotate relative to the pocket when the driver 505 rotates.

I claim:

1. In an open faced spinning reel used for casting a bait attached to a fishing line and for retrieving the bait and fishing line after casting,
    (a) the reel having a housing with a front forward spool end face, a rear wall, a partition spaced from said rear wall to form a drag pocket in the housing adjacent said rear wall and a central passageway extending from the face to the rear wall defining a central axis,
    (b) a pinion assembly mounted in the housing,
    (c) a centershaft rotatably mounted in the housing and coaxial with the central axis, said centershaft having an axially extending keyed portion in the drag pocket,
    (d) a spool mounted on the shaft for holding the fishing line, and
    (e) a handle and gear train assembly mounted in the housing for rotating the centershaft and the spool, the improvement being a drag adjusting mechanism for changing the drag on the centershaft and on the spool comprising:
    A. driver means in the drag pocket keyed on said keyed portion of the centershaft for rotation with said centershaft, said means having a non-symmetrical shape about the outer periphery thereof;
    B. driven means comprising a pair of shaped members having interfitting segments, said cup shaped members when interfitted enclosing said driver means therein, said driven means encircling said driver means and having an internal non-symmetrical shape matching and spaced from the non-symmetrical shape of the outer periphery of said driver means, said driven means having axially facing friction surfaces externally thereof;
    C. friction means encircling said centershaft on either side of said driven means;
    D. means urging said friction means, said driver means and said driven means toward said partition; and
    E. means coacting with the rear wall of said drag pocket and bearing on said means for urging said friction means toward the partition whereby axial movement of said last named means increases or decreases the drag on said centershaft by forcing the friction means between the partition and the driven means to resist rotation of the driven means by said driver means.

2. In a spinning reel as claimed in claim 1 wherein said means for urging said friction means comprises a disc shaped spring member encircling said shaft and bearing against one of said friction means.

3. In a spinning reel as claimed in claim 1 wherein said coacting means comprises a knob threaded into a threaded opening in said rear wall of said drag pocket, whereby turning said knob depresses or releases said urging means for increasing or decreasing drag on said driven means and on said driver means.

4. In a spinning reel as claimed in claim 1 wherein said driver means is hexagonal in outside configuration, and wherein said driven means has a hexagonal cavity therein mating with and spaced from the hexagonal configuration of the driver means.

5. In a spinning reel as claimed in claim 1 wherein the centershaft has a cross-shaped keyed portion and wherein said driver means has a cross-shaped opening engaging with the cross-shaped portion of the centershaft.

6. In the spinning reel as claimed in claim 1 wherein said means for urging said friction means comprises a spring means.

* * * * *